US012747345B2

(12) United States Patent
Inoue et al.

(10) Patent No.: US 12,747,345 B2
(45) Date of Patent: Sep. 29, 2026

(54) ETHYLENE-VINYL ALCOHOL COPOLYMER COMPOSITION

(71) Applicant: Mitsubishi Chemical Corporation, Tokyo (JP)

(72) Inventors: Kota Inoue, Tokyo (JP); Daichi Morita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 578 days.

(21) Appl. No.: 18/223,186

(22) Filed: Jul. 18, 2023

(65) Prior Publication Data

US 2023/0357554 A1 Nov. 9, 2023

Related U.S. Application Data

(63) Continuation of application No. PCT/JP2022/002399, filed on Jan. 24, 2022.

(30) Foreign Application Priority Data

Jan. 25, 2021 (JP) ................................. 2021-009870

(51) Int. Cl.
*C08L 29/04* (2006.01)

(52) U.S. Cl.
CPC ......... *C08L 29/04* (2013.01); *C08L 2205/025* (2013.01); *C08L 2205/03* (2013.01)

(58) Field of Classification Search
CPC ............... C08L 29/04; C08L 2205/025; C08L 2205/03; C09D 129/04; C08F 216/06
See application file for complete search history.

(56) References Cited

U.S. PATENT DOCUMENTS

| | | | | |
|---|---|---|---|---|
| 5,322,877 | A * | 6/1994 | Moriyama | B29C 48/27 524/400 |
| 6,183,863 | B1 | 2/2001 | Kawachi et al. | |
| 2015/0144523 | A1* | 5/2015 | Hirose | B65D 1/0207 206/524.6 |
| 2017/0087812 | A1* | 3/2017 | Hirose | C08L 23/0861 |
| 2018/0340060 | A1 | 11/2018 | Yoshida et al. | |
| 2019/0315933 | A1 | 10/2019 | Nakajima et al. | |
| 2020/0086617 | A1 | 3/2020 | Suzuki et al. | |
| 2020/0087496 | A1 | 3/2020 | Usui et al. | |
| 2020/0216658 | A1 | 7/2020 | Ito et al. | |
| 2021/0317286 | A1 | 10/2021 | Komuro | |

FOREIGN PATENT DOCUMENTS

| | | | | |
|---|---|---|---|---|
| CN | 104271453 | A | | 8/2017 |
| CN | 109642058 | A | | 4/2019 |
| CN | 110662802 | A | | 1/2020 |
| CN | 110678330 | A | | 1/2020 |
| JP | H5-255554 | A | | 10/1993 |
| JP | 2005-68300 | A | | 3/2005 |
| JP | 2005068300 | A | * | 3/2005 |
| JP | 2011252101 | A | * | 12/2011 |
| JP | 2018-109171 | A | | 7/2018 |
| JP | 2020-132858 | A | | 8/2018 |
| JP | 2020-138988 | A | | 9/2020 |
| JP | 2021-25039 | A | | 2/2021 |
| JP | 2021025039 | A | * | 2/2021 |
| WO | 2013/172226 | A1 | | 11/2013 |
| WO | 2015/141610 | A1 | | 9/2015 |
| WO | 2020/158803 | A1 | | 8/2020 |

OTHER PUBLICATIONS

English translation JP2005068300A (Year: 2005).*
English translation JP2011252101A (Year: 2011).*
English translation JP2021025039A (Year: 2021).*
Office Action dated Oct. 28, 2025, issued in Japanese patent application No. 2022-576769, with English machine translation thereof.
Supplemental European Search Report dated Jun. 27, 2024, issued in European patent application No. 22742708.5.
Office Action issued Jun. 10, 2025 in Chinese Patent Application No. 202280010873.3, with English machine translation thereof.
Search Report issued Jun. 10, 2025 in Chinese Patent Application No. 202280010873.3, with English translation thereof.
Search report of Decision to Grant a Patent, mailed Dec. 29, 2025, issued in Chinese patent application No. 202280010873.3.
International Search Report dated Mar. 22, 2023, issued in PCT/JP2022/002399, with English translation thereof.
International Preliminary Report on Patentability dated Jul. 20, 2023, issued in PCT/JP2022/002399, including Written Opinion dated Mar. 14, 2022, with English translation thereof.

* cited by examiner

*Primary Examiner* — Alicia Bland
(74) *Attorney, Agent, or Firm* — Greenblum & Bernstein, P.L.C.

(57) ABSTRACT

An ethylene-vinyl alcohol copolymer composition that contains an ethylene-vinyl alcohol copolymer (A), an unmodified polyolefin (B), and an acid-modified polyolefin (C). The mass ratio [(B)/(C)] between the unmodified polyolefin (B) and the acid-modified polyolefin (C) is 75/25 to 1/99. The melt viscosity ratio [(η1)/(η2)] between the melt viscosity (η1) of the composition at 210° C. and a shear rate of 18 ($sec^{-1}$) and the melt viscosity (η2) of the composition at 210° C. and a shear rate of 365 ($sec^{-1}$) is 5.6 or more. The mass ratio [(A)/((B)+(C))] between the ethylene-vinyl alcohol copolymer (A) and the total content of the unmodified polyolefin (B) and the acid-modified polyolefin (C) is 60/40 or more and less than 75/25.

10 Claims, No Drawings

ETHYLENE-VINYL ALCOHOL COPOLYMER COMPOSITION

RELATED APPLICATIONS

This application is a continuation of International Application No. PCT/JP2022/002399, filed on Jan. 24, 2022, which claims priority to Japanese Patent Application No. 2021-009870, filed on Jan. 25, 2021, the entire contents of each of which being herein incorporated by reference.

TECHNICAL FIELD

The present disclosure relates to an ethylene-vinyl alcohol copolymer composition (which may be referred to as an "EVOH resin composition" hereinafter) that contains an ethylene-vinyl alcohol copolymer (which may be referred to as an "EVOH" hereinafter). Specifically, the present disclosure relates to an EVOH resin composition having excellent fracture elongation properties at low temperatures.

BACKGROUND ART

Conventionally, metals have been used as a material of a fuel tank, but recently, resins have come into use for the purpose of weight reduction and the like. Such a fuel tank made of resin is commonly formed through blow molding, injection molding, tube molding, or the like. Moreover, for example, a resin composition formed by blending a soft thermoplastic resin with a saponified ethylene-vinyl acetate copolymer is proposed for applications that require flexibility (PTL 1).

Specifically, the technology disclosed in PTL 1 was achieved for the purpose of providing a multilayer structure having excellent oxygen barrier properties, high flexibility, and high flex resistance as a result of blending an unmodified ethylene-α-olefin copolymer, an acid-modified ethylene-α-olefin copolymer, and an EVOH having a melt flow rate (MFR) in a specific range at a specific ratio and additionally blending an alkali metal salt, but the technology has a problem in that elongation of the multilayer structure is insufficient when used at low temperatures.

Also, a resin composition made of an EVOH and an acid-modified ethylene-butene copolymer obtained through acid modification using an unsaturated carboxylic anhydride is proposed for the purpose of providing a hydrogen fuel tank (PTL 2).

Specifically, the technology disclosed in PTL 2 was achieved for the purpose of providing a resin composition that contains an EVOH and an acid-modified ethylene-butene copolymer having a specific storage elastic modulus and that can have both fuel barrier properties (particularly, hydrogen barrier properties) and impact resistance at low temperatures, and a molded product (fuel tank) made of the resin composition.

CITATION LIST

Patent Literature

PTL 1: WO 2015/141610
PTL 2: JP 2005-68300A

SUMMARY

Technical Problem

However, with the technology disclosed in PTL 2, favorable fracture elongation is not obtained at low temperatures, and thus there is room for improvement. It is considered that the reason for this is that the elastomer component is only constituted by an acid-modified elastomer and the interfacial interaction between the EVOH and the elastomer is excessively strong, and therefore, when deformation is induced, deformation caused by boundary separation is less likely to occur, which leads to poor elongation.

The present disclosure was achieved in view of the above circumstances, and provides an EVOH resin composition with improved fracture elongation properties at low temperatures.

Solution to Problem

In view of the circumstances above, the inventors of the present disclosure conducted in-depth research. As a result, they found that an EVOH resin composition that is produced by using specific elastomers (unmodified polyolefin and acid-modified polyolefin) together at a specific ratio and is controlled to have a specific melt viscosity ratio can have improved fracture elongation properties at low temperatures. It is inferred that this EVOH resin composition has an appropriate interfacial interaction between the EVOH and the elastomer, and thus the magnitude of elongation is increased due to yield deformation of the materials and deformation caused by boundary separation.

Specifically, the present disclosure provides [1] to [10] below.

[1] An ethylene-vinyl alcohol copolymer composition containing: an ethylene-vinyl alcohol copolymer (A); an unmodified polyolefin (B); and an acid-modified polyolefin (C), wherein a mass ratio [(B)/(C)] between the unmodified polyolefin (B) and the acid-modified polyolefin (C) is 75/25 to 1/99, a melt viscosity ratio [(η1)/(η2)] between a melt viscosity (η1) of the composition at 210° C. and a shear rate of 18 ($sec^{-1}$) and a melt viscosity (η2) of the composition at 210° C. and a shear rate of 365 ($sec^{-1}$) is 5.6 or greater, and a mass ratio [(A)/((B)+(C))] between the ethylene-vinyl alcohol copolymer (A) and a total content of the unmodified polyolefin (B) and the acid-modified polyolefin (C) is 60/40 or more and less than 75/25.

[2] The ethylene-vinyl alcohol copolymer composition according to [1], wherein the unmodified polyolefin (B) is an unmodified ethylene-α-olefin copolymer.

[3] The ethylene-vinyl alcohol copolymer composition according to [1] or [2], wherein the unmodified polyolefin (B) is an unmodified ethylene-butene copolymer.

[4] The ethylene-vinyl alcohol copolymer composition according to any one of [1] to [3], wherein the acid-modified polyolefin (C) is an acid-modified ethylene-α-olefin copolymer.

[5] The ethylene-vinyl alcohol copolymer composition according to any one of [1] to [4], wherein the acid-modified polyolefin (C) is an acid-modified ethylene-butene copolymer.

[6] The ethylene-vinyl alcohol copolymer composition according to [1], wherein the unmodified polyolefin (B) is an unmodified ethylene-butene copolymer, and the acid-modified polyolefin (C) is an acid-modified ethylene-butene copolymer.

[7] The ethylene-vinyl alcohol copolymer composition according to any one of [1] to [6], wherein the acid-modified polyolefin (C) has a melt flow rate of 1.0 g or more/10 minutes under conditions of a temperature of 190° C. and a load of 2160 g.

[8] The ethylene-vinyl alcohol copolymer composition according to any one of [1] to [7], wherein the melt viscosity ($\eta$1) is 10000 (mPa·s) or less.

[9] The ethylene-vinyl alcohol copolymer composition according to any one of [1] to [8], wherein the mass ratio [(A)/((B)+(C))] between a content of the ethylene-vinyl alcohol copolymer (A) and a total content of the unmodified polyolefin (B) and the acid-modified polyolefin (C) is 60/40 or more and 68/32 or less.

[10] A molded product including at least one layer made of the ethylene-vinyl alcohol copolymer composition according to any one of [1] to [9].

Advantageous Effects of Invention

With the EVOH resin composition of the present disclosure, it is possible to improve fracture elongation properties at low temperatures.

DESCRIPTION OF EMBODIMENT

Hereinafter, the present disclosure will be described in detail. However, the following description is directed to an example of desirable aspects, and the present disclosure is not limited to this description.

An EVOH resin composition according to an embodiment of the present disclosure is an EVOH resin composition containing an EVOH (A), an unmodified polyolefin (B), and an acid-modified polyolefin (C), wherein the mass ratio [(B)/(C)] between the unmodified polyolefin (B) and the acid-modified polyolefin (C) is 75/25 to 1/99, the melt viscosity ratio [($\eta$1)/($\eta$2)] between the melt viscosity ($\eta$1) of the EVOH resin composition at 210° C. and a shear rate of 18 ($sec^{-1}$) and the melt viscosity ($\eta$2) of the EVOH resin composition at 210° C. and a shear rate of 365 ($sec^{-1}$) is 5.6 or greater, and the mass ratio [(A)/((B)+(C))] between the ethylene-vinyl alcohol copolymer (A) and the total content of the unmodified polyolefin (B) and the acid-modified polyolefin (C) is 60/40 or more and less than 75/25.

The constituent components used in the present disclosure will be described below.

EVOH (A)

The EVOH (A) is typically a resin obtained through saponification of a copolymer of ethylene and a vinyl ester monomer (ethylene-vinyl ester copolymer), and is a water-insoluble thermoplastic resin. The polymerization can be performed using any known polymerization method, such as solution polymerization, suspension polymerization, or emulsion polymerization, but solution polymerization using a lower alcohol such as methanol as a solvent is typically used. The saponification of the obtained ethylene-vinyl ester copolymer can also be performed using a known method. The EVOH (A) produced in this manner mainly contains ethylene structural units and vinyl alcohol structural units as the structural units, and contains a small amount of vinyl ester structural units that remain unsaponified.

As the vinyl ester monomer, vinyl acetate is typically used because of good market availability and efficiency in treating impurities during production. Examples of other vinyl ester monomers include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate, and it is possible to use aliphatic vinyl esters typically with 3 to 20 carbon atoms, preferably with 4 to 10 carbon atoms, and particularly preferably with 4 to 7 carbon atoms. These vinyl ester monomers are usually used alone, but a plurality of these vinyl ester monomers may be used together as necessary.

The percentage of the ethylene content in the EVOH (A) is not particularly limited, but is preferably 20 to 60 mol %, more preferably 25 to 50 mol %, and particularly preferably 25 to 45 mol %, when measured based on ISO 14663. If this percentage is too low, the oxygen barrier properties and melt moldability under high humidity tend to be impaired, and conversely, if this percentage is too high, the oxygen barrier properties tend to be impaired.

The degree of saponification of the vinyl ester component in the EVOH (A) is not particularly limited, but is preferably 90 to 100 mol %, more preferably 95 to 100 mol %, and particularly preferably 99 to 100 mol %, when measured based on JIS K6726 (where the EVOH is used as a solution in which it is dissolved uniformly in a water/methanol solvent). If the degree of saponification is too low, the oxygen barrier properties, thermal stability, moisture resistance, and the like tend to be impaired.

The melt flow rate (MFR) (at 210° C. and a load of 2160 g) of the EVOH (A) is not particularly limited, but is preferably 0.5 to 100 g/10 minutes, more preferably 1 to 60 g/10 minutes, and particularly preferably 3 to 50 g/10 minutes. If the MFR is too high, the film forming properties tend to be impaired, and if the MFR is too low, the melt viscosity tends to be too high and melt extrusion tends to be difficult.

The EVOH (A) may further include structural units derived from a comonomer described below in addition to the ethylene structural units and the vinyl alcohol structural units (including vinyl ester structural units that remain unsaponified). Examples of the comonomer include: $\alpha$-olefins such as propylene, isobutene, $\alpha$-octene, $\alpha$-dodecene, and $\alpha$-octadecene; hydroxy group-containing $\alpha$-olefins such as 3-buten-1-ol, 4-penten-1-ol, and 3-butene-1,2-diol, or hydroxy group-containing $\alpha$-olefin derivatives such as esterified products and acylated products of the hydroxy group-containing $\alpha$-olefins; unsaturated carboxylic acids, or salts, partial alkylesters, complete alkylesters, nitriles, amides or anhydrides of the unsaturated carboxylic acids; unsaturated sulfonic acids, or salts of the unsaturated sulfonic acids; vinylsilane compounds; vinyl chloride; and styrene.

Furthermore, the EVOH can also be "post-modified" through urethanation, acetalization, cyanoethylation, oxyalkylenation, or the like.

Among the above-described modified products, an EVOH having a side chain into which a primary hydroxy group has been introduced through copolymerization is preferable in terms of good secondary moldability such as moldability during stretching treatment and vacuum/air pressure forming, and an EVOH having a side chain with a 1,2-diol structure is more preferable.

The EVOH having a side chain with a 1,2-diol structure includes a 1,2-diol structural unit in the side chain, and preferably includes a structural unit represented by the general formula (1) below.

[Chemical Formula 1]

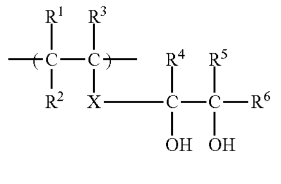

(1)

In the general formula (1), $R^1$, $R^2$, $R^3$, $R^4$, $R^5$, and $R^6$ independently represent a hydrogen atom or an organic group, and X represents a single bond or a linking chain.

Examples of the organic group include an alkyl group having 1 to 4 carbon atoms such as a methyl group, an ethyl group, an n-propyl group, an isopropyl group, an n-butyl group, an isobutyl group, and a tert-butyl group, and the organic group may have a functional group such as a halogen group, a hydroxy group, an ester group, a carboxylic acid group, or a sulfonic acid group, as needed.

Examples of the linking chain include hydrocarbons such as alkylene, alkenylene, alkynylene, phenylene, and naphthylene (these hydrocarbons may be subjected to substitution with a halogen such as fluorine, chlorine, or bromine, or the like) as well as —O—, $—(CH_2O)_m—$, $—(OCH_2)_m—$, $—(CH_2O)_mCH_2—$, —CO—, —COCO—, $—CO(CH_2)_mCO—$, $—CO(C_6H_4)CO—$, —S—, —CS—, —SO—, $—SO_2—$, —NR—, —CONR—, —NRCO—, —CSNR—, —NRCS—, —NRNR—, —HPO4-, $—Si(OR)_2—$, $—OSi(OR)_2—$, $—OSi(OR)_2O—$, $—Ti(OR)_2—$, $—OTi(OR)_2—$, $—OTi(OR)_2O—$, —Al(OR)—, —OAl(OR)—, —OAl(OR)O—, and the like (R independently represents any substituent and is preferably a hydrogen atom or an alkyl group having 1 to 12 carbon atoms, and m is a natural number). Of these, an alkylene group having 6 or less carbon atoms, particularly a methylene group, or $—CH_2OCH_2—$ is preferable in terms of stability during manufacturing or use.

The EVOH having a side chain with 1,2-diol structure is particularly preferably an EVOH that includes a structural unit represented by the general formula (1') below, namely a structural unit in which all of $R^1$, $R^2$, $R^3$, $R^4$, $R^5$, and $R^6$ are hydrogen atoms, and X is a single bond.

[Chemical Formula 2]

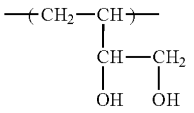

(1')

Moreover, the EVOH (A) may be a mixture that includes two or more different types of EVOHs, and these different types of EVOHs may differ in the percentage of the ethylene content, the degree of saponification, the MFR (at 210° C. and a load of 2160 g), the copolymerization components, the modification level (e.g., the content of the 1,2-diol structural units), or the like.

The EVOH resin composition according to an embodiment of the present disclosure contains the EVOH (A) as a base resin, and the content of the EVOH (A) is typically 50 mass % or more, preferably 50 to 90 mass %, more preferably 55 to 85 mass %, and particularly preferably 60 to 80 mass %, with respect to the entire EVOH resin composition.

Unmodified Polyolefin (B)

There is no particular limitation on the unmodified polyolefin (B), and known unmodified polyolefins can be used. Examples of the unmodified polyolefin include unmodified olefin homopolymers composed of an olefin monomer such as ethylene, propylene, or butene, and unmodified olefin block copolymers and unmodified olefin random copolymers composed of two or more types of olefin monomers. These unmodified polyolefins may be used alone or as a mixture of two or more.

Examples of the unmodified olefin homopolymer include unmodified polyethylene, unmodified polypropylene, unmodified polybutene, and unmodified polymethylpentene. Examples of the unmodified olefin block copolymer include unmodified ethylene-α-olefin copolymers, unmodified propylene-α-olefin copolymers, and unmodified butene-α-olefin copolymers. Examples of the unmodified olefin random copolymer include copolymers obtained through random copolymerization of two or more types of the olefin monomers above.

Of these, the unmodified polyolefin (B) is preferably an unmodified ethylene-α-olefin copolymer obtained through copolymerization of ethylene and an α-olefin having 3 to 20 carbon atoms, more preferably an unmodified ethylene-α-olefin copolymer obtained through copolymerization of ethylene and an α-olefin having 3 to 10 carbon atoms, particularly preferably an unmodified ethylene-α-olefin copolymer obtained through copolymerization of ethylene and an α-olefin having 2 to 8 carbon atoms, and even more preferably an unmodified ethylene-butene copolymer, from the viewpoint of improving the fracture elongation properties at low temperatures.

The density of the unmodified polyolefin (B) is not particularly limited, but is typically 0.900 $g/cm^3$ or less, preferably 0.890 $g/cm^3$ or less, and particularly preferably 0.885 $g/cm^3$ or less. Using such a low-density unmodified polyolefin copolymer (B) makes it possible to obtain a molded product having excellent fracture elongation properties at low temperatures. The lower limit of the density of the unmodified polyolefin copolymer (B) is typically 0.850 $g/cm^3$ or more.

The MFR (at 190° C. and a load of 2160 g) of the unmodified polyolefin (B) is not particularly limited, but is typically 1.0 to 100 g/10 minutes, and preferably 2.0 to 60 g/10 minutes. Using such an unmodified polyolefin (B) makes it possible to further improve the stability of the obtained EVOH resin composition during extrusion, and the fracture elongation properties of the obtained molded product at low temperatures.

The content of the unmodified polyolefin (B) is typically 5 mass % or more, preferably 5 to 40 mass %, more preferably 5 to 35 mass %, and particularly preferably 5 to 30 mass %, with respect to the entire EVOH resin composition.

Note that the term "unmodified polyolefin" as used herein refers to an unmodified polyolefin that has not been subjected to acid modification, and an example of such an unmodified polyolefin is an unmodified polyolefin copolymer other than the "acid-modified polyolefin (C)", which will be described below. The acid value of the unmodified polyolefin (B) is not particularly limited, but is preferably less than 0.5 mg KOH/g. The acid value can be determined through neutralization titration based on JIS K 0070.

Acid-Modified Polyolefin (C)

The acid-modified polyolefin (C) is a polyolefin modified with an acid. There is no particular limitation on the acid-modified polyolefin (C), and known acid-modified polyolefins can be used. These acid-modified polyolefins may be used alone or as a mixture of two or more.

The acid-modified polyolefin (C) is obtained by, for example, introducing an α,β-unsaturated carboxylic acid or an anhydride of the α,β-unsaturated carboxylic acid into some side chains through replacement of some monomer molecules to be included in an unmodified polyolefin with molecules of an α,β-unsaturated carboxylic acid or an anhydride monomer of the α,β-unsaturated carboxylic acid before copolymerizing the monomers, or through a grafting reaction or the like such as radical addition, or the like.

There is no particular limitation on the unmodified polyolefin, and known unmodified polyolefins can be used. Examples of the unmodified polyolefin include unmodified olefin homopolymers composed of an olefin monomer such as ethylene, propylene, or butene, and unmodified olefin block copolymers and unmodified olefin random copolymers composed of two or more types of olefin monomers. Examples of the unmodified olefin homopolymer include unmodified polyethylene, unmodified polypropylene, unmodified polybutene, and unmodified polymethylpentene. Examples of the unmodified olefin block copolymer include unmodified ethylene-α-olefin copolymers, unmodified propylene-α-olefin copolymers, and unmodified butene-α-olefin copolymers. Examples of the unmodified olefin random copolymer include copolymers obtained through random copolymerization of two or more types of the olefin monomers above.

Examples of the α,β-unsaturated carboxylic acid or an anhydride of the α,β-unsaturated carboxylic acid used for the acid modification include maleic acid, acrylic acid, itaconic acid, crotonic acid, maleic anhydride, and itaconic anhydride. Of these, maleic anhydride is favorably used.

The acid-modified polyolefin (C) is preferably an acid-modified ethylene-α-olefin copolymer obtained through acid modification of a copolymer of ethylene and an α-olefin having 3 to 20 carbon atoms, more preferably an acid-modified ethylene-α-olefin copolymer obtained through acid modification of a copolymer of ethylene and an α-olefin having 3 to 10 carbon atoms, particularly preferably an acid-modified ethylene-α-olefin copolymer obtained through acid modification of a copolymer of ethylene and an α-olefin having 2 to 8 carbon atoms, even more preferably an acid-modified ethylene-butene copolymer, and most preferably a maleic anhydride-modified ethylene-butene copolymer, from the viewpoint of improving the fracture elongation properties at low temperatures.

The acid value of the acid-modified polyolefin (C) is not particularly limited, but is typically 50 mg KOH/g or less, preferably 30 mg KOH/g or less, and particularly preferably 20 mg KOH/g or less. If the acid value is too high, the number of sites in the EVOH (A) that react with hydroxy groups will increase, which tends to lead to a highly polymerized product being formed in the melt kneading process, the stability being impaired during extrusion, and thus a favorable molded product being unlikely to be obtained. Meanwhile, if the acid value is too low, compatibility with the EVOH (A) will be impaired, which tends to lead to the amount of resin attached to a die (die drool) increasing during extension, and the fracture elongation properties at low temperatures being impaired. The lower limit of the acid value is typically 1 mg KOH/g or more, and preferably 2 mg KOH/g or more. The acid value can be determined through neutralization titration based on JIS K 0070.

The density of the acid-modified polyolefin (C) is not particularly limited, but is typically 0.900 $g/cm^3$ or less, preferably 0.890 $g/cm^3$ or less, and particularly preferably 0.885 $g/cm^3$ or less. Using such a low-density acid-modified polyolefin (C) makes it possible to obtain a molded product having excellent fracture elongation properties at low temperatures. The lower limit of the density of the acid-modified polyolefin (C) is typically 0.850 $g/cm^3$ or more.

The MFR (at 190° C. and a load of 2160 g) of the acid-modified polyolefin (C) is not particularly limited, but is preferably 1.0 g or more/10 minutes, more preferably 1.0 to 60 g/10 minutes, even more preferably 1.5 to 60 g/10 minutes, and particularly preferably 2.0 to 60 g/10 minutes. Using such an acid-modified polyolefin (C) makes it possible to further improve fracture elongation properties at low temperatures.

The content of the acid-modified polyolefin (C) is typically 5 mass % or more, preferably 5 to 40 mass %, more preferably 5 to 35 mass %, and particularly preferably 5 to 30 mass %, with respect to the entire EVOH resin composition.

Mass Ratio Between (B) and (C)

The EVOH resin composition according to an embodiment of the present disclosure is characterized in that the unmodified polyolefin (B) and the acid-modified polyolefin (C) are used together at a specific mass ratio [(B)/(C))], and the mass ratio [(B)/(C)] between the unmodified polyolefin (B) and the acid-modified polyolefin (C) is 75/25 to 1/99, preferably 70/30 to 10/90, and particularly preferably 65/35 to 15/85, from the viewpoint of improving the fracture elongation properties at low temperatures. If the mass ratio [(B)/(C))] exceeds 75/25, the fracture elongation properties of the obtained molded product will be insufficient at low temperatures. Meanwhile, if the mass ratio [(B)/(C)] is less than 1/99, the amount of generated die drool will increase, leading to insufficient moldability.

Mass Ratio Between (A), (B), and (C)

The mass ratio [(A)/((B)+(C))] between the content of the EVOH (A) and the total content of the unmodified polyolefin (B) and the acid-modified polyolefin (C) in the EVOH resin composition according to an embodiment of the present disclosure is preferably 60/40 to 99/1, more preferably 60/40 to 79/21, and particularly preferably 60/40 to 75/25, from the viewpoint of improving the fracture elongation properties at low temperatures. That is to say, the mass ratio [(A)/((B)+(C))] between the content of the EVOH (A) and the total content of the unmodified polyolefin (B) and the acid-modified polyolefin (C) in the EVOH resin composition according to an embodiment of the present disclosure is particularly preferably 60/40 or more and less than 75/25 from the viewpoint of improving the fracture elongation properties at low temperatures.

In the present disclosure, the mass ratio [(A)/((B)+(C))] is 60/40 or more and less than 75/25 from the viewpoint of improving the fracture elongation properties at low temperatures. In particular, the mass ratio [(A)/((B)+(C))] is preferably 60/40 or more and 68/32 or less.

If the mass ratio [(A)/((B)+(C))] exceeds the upper limit above, or the unmodified polyolefin (B) and the acid-modified polyolefin (C) are not contained, the fracture elongation properties of the obtained molded product tend to be impaired at low temperatures. Meanwhile, if the mass ratio [(A)/((B)+(C))] is less than 60/40, the EVOH (A) does not form a matrix phase, for example, and thus the hydrogen barrier properties of the molded product tend to be impaired.

Other Components

The EVOH resin composition according to an embodiment of the present disclosure may contain another resin as necessary in addition to the EVOH (A), the unmodified polyolefin (B), and the acid-modified polyolefin (C), as long as the effects of the present disclosure are not impaired (for example, the content of the other resin is less than 5 mass % with respect to the entire EVOH resin composition). Examples of the other resin include: polyamide resins such as nylon 11, nylon 12, nylon 6, nylon 66, and nylon 6.66; unmodified vinyl alcohol resins that do not have a structural unit represented by the general formula (1) above; and other thermoplastic resins. These resins may be used alone or as a mixture of two or more.

The content of the other resin is typically 50 parts by mass or less, preferably 40 parts by mass or less, more preferably 30 parts by mass or less, particularly preferably 20 parts by mass or less, and even more preferably 10 parts by mass or less, with respect to 100 parts by mass of the EVOH (A).

Also, the EVOH resin composition according to an embodiment of the present disclosure may contain various additives as necessary, as long as the effects of the present disclosure are not impaired. Examples of the additives include known additives including: a plasticizer such as aliphatic polyhydric alcohol (e.g., ethylene glycol, glycerin, or hexanediol); a lubricant such as saturated aliphatic amide (e.g., stearic acid amide), an unsaturated fatty acid amide (e.g., oleic acid amide), or a bis fatty acid amide (e.g., ethylene bis stearic acid amide); an antiblocking agent; an antioxidant; a coloring agent; an antistatic agent; an ultraviolet absorber; an antibacterial agent; an insoluble inorganic salt (e.g., hydrotalcite); a filler (e.g., inorganic filler); an oxygen absorber (e.g., a ring-opened polymer of cycloalkene such as polyoctenylene, or a cyclized product of a conjugated diene polymer such as butadiene); a surfactant, a wax; a dispersing agent (e.g., stearic acid monoglyceride); a thermal stabilizer; a light stabilizer, a drying agent; a flame retardant; a crosslinking agent; a curing agent; a foaming agent; a crystal nucleating agent; an antifogging agent; a biodegradable additive; a silane coupling agent; and a conjugated polyene compound. These additives may be used alone or as a mixture of two or more.

The thermal stabilizer is used in order to improve various physical properties such as thermal stability during melt molding, and examples of the thermal stabilizer include: organic acids such as acetic acid, propionic acid, butyric acid, lauric acid, stearic acid, oleic acid, and behenic acid, or salts of the organic acids with alkali metals (e.g., sodium and potassium), alkaline earth metals (e.g., calcium and magnesium), and zinc and the like; or inorganic acids such as sulfuric acid, sulfurous acid, carbonic acid, phosphoric acid, and boric acid, or salts of the inorganic acids with alkali metals (e.g., sodium and potassium), alkaline earth metals (e.g., calcium and magnesium), and zinc and the like. These thermal stabilizers may be used alone or as a mixture of two or more.

EVOH Resin Composition

The EVOH resin composition according to an embodiment of the present disclosure can be prepared by blending the EVOH (A), the unmodified polyolefin (B), and the acid-modified polyolefin (C), and another resin and an additive as needed, at a specific ratio, and melt-kneading the resultant mixture.

Specifically, the EVOH resin composition can be produced by melt-kneading the EVOH (A), the unmodified polyolefin (B), and the acid-modified polyolefin (C) at such a blend ratio that the mass ratio [(B)/(C)] between the unmodified polyolefin (B) and the acid-modified polyolefin (C) is 75/25 to 1/99. It is more preferable to produce the EVOH resin composition by melt-kneading the EVOH (A), the unmodified polyolefin (B), and the acid-modified polyolefin (C) at such a blend ratio that the mass ratio [(B)/(C)] between the unmodified polyolefin (B) and the acid-modified polyolefin (C) is 75/25 to 1/99, and the mass ratio [(A)/((B)+(C))] between the content of the EVOH (A) and the total content of the unmodified polyolefin (B) and the acid-modified polyolefin (C) is 60/40 to 99/1.

That is to say, it is preferable to produce the EVOH resin composition according to an embodiment of the present disclosure by melt-kneading the EVOH (A), the unmodified polyolefin (B), and the acid-modified polyolefin (C) at such a blend ratio that the mass ratio [(B)/(C)] between the unmodified polyolefin (B) and the acid-modified polyolefin (C) is 75/25 to 1/99, and the mass ratio [(A)/((B)+(C))] between the content of the EVOH (A) and the total content of the unmodified polyolefin (B) and the acid-modified polyolefin (C) is 60/40 or more and less than 75/25.

Known kneaders such as an extruder, a Banbury mixer, a kneader-ruder, a mixing roll, and a plastomill can be used to perform melt-kneading. Examples of the extruder include a single-screw extruder and a twin-screw extruder. A method can be employed in which the EVOH resin composition is extruded in a strand shape and cut into pellets after the melt-kneading.

This melt-kneading may be performed by charging the EVOH (A), the unmodified polyolefin (B), and the acid-modified polyolefin (C) all at once, or side-feeding the unmodified polyolefin (B) and the acid-modified polyolefin (C) in a molten state or solid state into the EVOH (A) as it is being melt-kneaded using a twin-screw extruder.

The melt-kneading temperature is selected as appropriate depending on the types of the EVOH (A), the unmodified polyolefin (B), and the acid-modified polyolefin (C), but is typically 215 to 270° C., preferably 215 to 265° C., more preferably 220 to 260° C., and particularly preferably 220 to 250° C.

The melt-kneading time is selected as appropriate depending on the types of the unmodified polyolefin (B) and the acid-modified polyolefin (C), but is typically 0.1 to 30 minutes, preferably 0.3 to 10 minutes, and more preferably 0.5 to 5 minutes.

The melt viscosity ($\eta 1$) at 210° C. and a shear rate of 18 ($sec^{-1}$) of the EVOH resin composition according to an embodiment of the present disclosure obtained as described above is preferably 10000 (mPa·s) or less, more preferably 9500 (mPa·s) or less, and particularly preferably 9000 (mPa·s) or less. If the melt viscosity ($\eta 1$) is too high, the molding processability tends to be impaired. For example, if the melt viscosity ($\eta 1$) is too high, the trend is that a melt fracture is likely to occur in the case of single-layer film formation, whereas there is a trend of an interface having increased roughness due to an increase in shearing stress in the case of multilayer film formation. The lower limit of the melt viscosity ($\eta 1$) is typically 2000 (mPa·s) or more.

Also, the melt viscosity ($\eta 2$) at 210° C. and a shear rate of 365 ($sec^{-1}$) of the EVOH resin composition according to an embodiment of the present disclosure is preferably 4000 (mPa·s) or less, more preferably 3000 (mPa·s) or less, and particularly preferably 2000 (mPa·s) or less. If the melt viscosity ($\eta 2$) is too high, the molding processability tends to be impaired. For example, if the melt viscosity ($\eta 2$) is too high, the trend is that a melt fracture is likely to occur in the case of single-layer film formation, whereas there is a trend of an interface having increased roughness due to an increase in shearing stress in the case of multilayer film formation. The lower limit of the melt viscosity ($\eta 2$) is typically 300 (mPa·s) or more.

Note that the melt viscosity can be measured in conformity with JIS K7199:1999 using, for example, a capillary rheometer such as "Capilograph 1D" manufactured by Toyo Seiki Seisaku-sho, Ltd.

Melt Viscosity Ratio [($\eta 1$)/($\eta 2$)]

The EVOH resin composition according to an embodiment of the present disclosure is characterized in that the melt viscosity ratio [($\eta 1$)/($\eta 2$)] is controlled to a specific value, and the melt viscosity ratio [($\eta 1$)/($\eta 2$)] of the EVOH resin composition according to an embodiment of the present disclosure between the melt viscosity ($\eta 1$) at 210° C. and a shear rate of 18 ($sec^{-1}$) and the melt viscosity ($\eta 2$) at 210° C. and a shear rate of 365 ($sec^{-1}$) is 5.6 or greater, preferably 5.8 or greater, more preferably 6.0 or greater, and particularly preferably 6.2 or greater. When the melt viscosity ratio is within the range above, the EVOH resin composition exhibits excellent fracture elongation at low temperatures, whereas if the melt viscosity ratio is not within the range above, the fracture elongation at low temperatures will decrease. Note that the upper limit of the melt viscosity ratio is typically 7.0 or smaller, and preferably 6.8 or smaller.

In the present disclosure, in order to control the melt viscosity ratio to be within the range above, it is preferable to use [i] a method of adjusting the mass ratio between the unmodified polyolefin (B) and the acid-modified polyolefin (C) to 75/25 to 1/99, preferably 70/30 to 10/90, and particularly preferably 65/35 to 15/85, [ii] a method of adjusting the MFR (at 190° C. and a load of 2160 g) of the acid-modified polyolefin (C) to preferably 1.0 g or more/10 minutes, more preferably 1.5 g or more/10 minutes, and even more preferably 2 g or more/10 minutes, [iii] a method of adjusting the difference between the MFR (at 190° C. and a load of 2160 g) of the unmodified polyolefin (B) and the MFR (at 190° C. and a load of 2160 g) of the acid-modified polyolefin (C) to 2.5 or smaller, preferably 2.0 or smaller, and more preferably 1.5 or smaller, or the like, but there is no particular limitation to these methods.

With this EVOH resin composition, the fracture elongation properties at low temperatures, which have been an EVOH weak point, are improved by using the unmodified polyolefin (B) and the acid-modified polyolefin (C). It is inferred that this EVOH resin composition has an appropriate interfacial interaction between the EVOH and the elastomer, and thus the magnitude of elongation is increased due to yield deformation of the materials and deformation caused by boundary separation.

The EVOH resin composition according to an embodiment of the present disclosure has excellent hydrogen gas barrier properties based on the EVOH (A). Also, the EVOH resin composition has an excellent gas barrier for hydrogen gas as well as excellent gas barrier properties for other gasses such as helium, oxygen, nitrogen, and air. The EVOH resin composition has excellent barrier properties particularly for a gas with a molecular weight of less than 10, such as hydrogen.

There is no particular limitation on a method for obtaining a molded product using the EVOH resin composition according to an embodiment of the present disclosure, but examples of the method include various molding methods applied to known, commonly used thermoplastic resins such as EVOH. Examples of the method include melt molding such as extrusion molding, co-extrusion molding, injection molding, blow molding, tube molding, and rotational molding. Specifically, extrusion blow molding is commonly used to produce a hollow molded product such as a fuel tank, tube molding is used to produce a tube-shaped (pipe-shaped) container, and injection molding is used to produce a molded product with a complex shape or a molded product that requires dimension accuracy.

Multilayer Structure

The molded product according to an embodiment of the present disclosure has at least one layer made of the EVOH resin composition (such a layer may also be referred to as a "resin composition layer" hereinafter). For the purpose of imparting various physical properties, the molded product according to an embodiment of the present disclosure may also be formed as a molded product having a multilayer structure formed by layering at least one other layer on the resin composition layer (e.g., a multilayer structure formed by layering a thermoplastic resin layer or the like containing another thermoplastic resin, on the resin composition layer) (such a molded product may also be referred to as a "multilayer structure" hereinafter).

For example, the multilayer structure according to an embodiment of the present disclosure includes an inner layer (i.e., a layer that comes into contact with high-pressure gas and fuel), an intermediate layer, and an outer layer (i.e., a layer that comes into contact with outside air). It is preferable that the multilayer structure includes the resin composition layer as the inner layer or the intermediate layer. From the viewpoint of preventing moisture from impairing the gas barrier properties of the resin composition layer, it is preferable that the multilayer structure includes the resin composition layer as the intermediate layer. Furthermore, it is preferable that the multilayer structure includes a thermoplastic resin layer containing a water-resistant and water-impermeable thermoplastic resin other than an EVOH, as the inner layer and/or the outer layer. Note that the intermediate layer refers to a layer located between the outer layer and the inner layer.

Moreover, the multilayer structure according to an embodiment of the present disclosure may further include a reinforcement layer. It is preferable that the reinforcement layer is located outside the outer layer and serves as a layer (outermost layer) that comes into contact with outside air, but there is no particular limitation to this configuration. Furthermore, an adhesive layer made of an adhesive resin may be provided between these layers.

For example, a hydrophobic thermoplastic resin is favorably used as the thermoplastic resin used to produce the thermoplastic resin layer. Examples of the hydrophobic thermoplastic resin include: polyolefin resins such as olefin homopolymers and copolymers (e.g., polyethylene resins including polyethylene (linear low-density polyethylene (LLDPE), low-density polyethylene (LDPE), medium-density polyethylene (MDPE), and high-density polyethylene (HDPE)), an ethylene-vinyl acetate copolymer, ionomers, an ethylene-propylene copolymer, an ethylene-α-olefin (α-olefin having 4 to 20 carbon atoms) copolymer, an ethylene-acrylic acid ester copolymer, polypropylene resins including polypropylene and a propylene-α-olefin (α-olefin having 4 to 20 carbon atoms) copolymer, polybutene, and polypentene), and cyclic polyolefins, or graft-modified polyolefin resins (carboxylic acid-modified polyolefin resins, and ester-modified polyolefin resins) obtained through graft modification of any of the aforementioned olefin homopolymers or copolymers with an unsaturated carboxylic acid or an ester of the unsaturated carboxylic acid; polystyrene resins; polyamide resins such as polyamides (e.g., nylon 11, nylon 12, nylon 6, and nylon 66) and copolymerized polyamides (e.g., nylon 6.12 and nylon 6.66); vinyl ester resins such as polyvinyl chloride, polyvinylidene chloride, acrylic resins, and polyvinyl acetate; polyurethane resins; fluorine polymers such as tetrafluoroethylene, tetrafluoroethylene/perfluoro (alkylvinyl ether) copolymers, ethylene/tetrafluoroethylene copolymers, and tetrafluoroethylene/hexafluoropropylene copolymers; chlorinated polyethylene; chlorinated polypropylene; fluororesins having a polar group, and thermoplastic polyurethane. These hydrophobic thermoplastic resins may be used alone or as a mixture of two or more. Of these, the polyolefin resins are preferable in terms of mechanical strength and melt molding processability, the polyethylene resins and the polypropylene resins are more preferable, and polyethylene and polypropylene are particularly preferable.

Various known adhesive resins can be used as the adhesive resin for the adhesive layer. Typical examples of the adhesive resin include carboxy group-containing modified olefin polymers obtained by chemically binding an unsaturated carboxylic acid or an anhydride of the unsaturated carboxylic acid to an olefin polymer (above-described polyolefin resin in a broad sense) through an addition reaction, a graft reaction, or the like. Specifically, one of, or a mixture of two or more selected from, maleic anhydride-grafted modified polyethylene, maleic anhydride-grafted modified polypropylene, maleic anhydride-grafted modified ethylene-ethyl acrylate copolymers, maleic anhydride-grafted modified ethylene-vinyl acetate copolymers and the like are preferable.

The thermoplastic resin layer and the adhesive layer may include conventionally known types of plasticizers, fillers, clay (e.g., montmorillonite), coloring agents, antioxidants, antistatic agents, lubricants, nucleating materials, antiblocking agents, ultraviolet absorbers, wax, and the like as long as the effects of the present disclosure are not impaired. These substances may be used alone or as a mixture of two or more.

Examples of the reinforcement layer include a reinforcement fiber layer in which fibers are used, and a reinforcement rubber layer in which rubber is used. For example, high-strength fibers such as poly p-phenylenebenzobisoxazole (PBO) fibers, aramid fibers, and carbon fibers; a nonwoven fabric; a woven fabric; paper; a metal foil; metal filaments; a woody face; and the like can be used for the reinforcement fiber layer. The reinforcement layer is preferably a reinforcement fiber layer, particularly preferably a reinforcement fiber layer in which high-strength fibers are used, and more preferably a sheet layer formed by braiding high-strength fibers or a reinforcement fiber layer formed by spirally winding the thus obtained sheet.

With regard to the layer structure of the multilayer structure according to an embodiment of the present disclosure, when a resin composition layer is represented by a (a1, a2, . . . ), the thermoplastic resin layer is represented by b (b1, b2, . . . ), and the reinforcement layer is represented by c (c1, c2, . . . ), any combinations, such as b/a, a/b, a1/b/a2, b1/a/b1, a1/b/a1, a1/a2/b, a/b1/b2, a/b/c, b/a/c, b2/b1/a/b1/b2, b1/a/b2/c, and b2/b1/a/b1/a/b1/b2 (in order from inside to outside), can be used. The adhesive layer may also be provided between layers of these multilayer structures.

With regard to the layer structure of the multilayer structure according to an embodiment of the present disclosure, when a recycled layer that is obtained by re-melting and re-molding offcuts, defective products, and the like generated in the process of producing the multilayer structure and that contains a mixture of the resin composition and a thermoplastic resin other than an EVOH is represented by R, any combinations, such as b/a/R, R/b/a, b/R/a/b, b/R/a/R/b, b/a/R/a/b, b/R/a/R/a/R/b, b/a/R/c, R/b/a, b/R/a/b/c, and b/R/a/R/b/c, can be used. The adhesive layer may also be provided between the layers of these multilayer structures.

Of these multilayer structures, a multilayer structure having a layer structure b1/a/b2 or b1/a/b2/c is preferable, and a multilayer structure having a layer structure in which the adhesive layer is provided between the layers of b1/a/b2 (thermoplastic resin layer/adhesive layer/resin composition layer/adhesive layer/thermoplastic resin layer) is particularly preferable. The multilayer structure according to an embodiment of the present disclosure is typically constituted by 2 to 20 layers, preferably 3 to 15 layers, and particularly preferably 4 to 10 layers.

Examples of a method for manufacturing the multilayer structure according to an embodiment of the present disclosure include a molding method in which a molten EVOH resin composition is used (melt molding), and a molding method in which an EVOH resin composition dissolved in a solvent is used (e.g., solution coating). Of these, the melt molding is preferable from the viewpoint of productivity.

Specifically, examples of the method for manufacturing the multilayer structure include a method in which a thermoplastic resin is melted and extruded onto a molded product of the EVOH resin composition according to an embodiment of the present disclosure (e.g., a film or sheet), a method in which the resin composition layer is formed by melting the resin composition and extruding the molten resin composition onto a base material constituted by a thermoplastic resin or the like, and a method in which the resin composition layer and a thermoplastic resin layer are co-extruded. Specifically, T-die extrusion, tubular extrusion, blow molding, heterogeneous extrusion, or the like is employed.

Furthermore, a method in which a film made of the EVOH resin composition according to an embodiment of the present disclosure and a base material such as a film made of a thermoplastic resin are dry laminated using a known adhesive such as an organotitanium compound, an isocyanate compound, a polyethyleneimine compound, a polyester compound, or a polyurethane compound, a method in which laminating is performed with an adhesive layer being provided between the layers, or the like is employed. In some cases, co-injection can also be employed.

The multilayer structure according to an embodiment of the present disclosure is then subjected to (heat) stretching as necessary. The stretching can be performed using a known stretching method, and examples of the stretching include uniaxial stretching and biaxial stretching. For biaxial stretching, either simultaneous biaxial stretching or sequential biaxial stretching can be employed. The stretching temperature is typically 40 to 170° C., and preferably about 60 to 160° C., based on the temperature of the multilayer structure (the temperature in the vicinity of the multilayer structure). The stretch ratio represented by an area ratio is typically 2 to 50, and preferably 2 to 20. Furthermore, after the stretching is complete, heat fixing may also be performed for the purpose of imparting dimensional stability to the obtained stretched film. Heat fixing can be performed using well-known means, and the stretched film is heat-treated at 80 to 180° C., and preferably 100 to 165° C., for about 2 to 600 seconds while keeping the stretched film under tension.

The thickness of the multilayer structure (including the stretched multilayer structure) according to an embodiment of the present disclosure is not particularly limited, but is typically 1 to 1500 μm, preferably 1 to 1000 μm, and more preferably 10 to 700 μm. The thickness of the thermoplastic resin layer in the multilayer structure is not particularly limited, but is typically 0.1 to 1000 μm, and preferably 1 to 500 μm. The thickness of the resin composition layer is not particularly limited, but is typically 0.1 to 500 μm, and preferably 1 to 100 μm. The thickness of the adhesive layer is not particularly limited, but is typically 0.1 to 250 μm, and preferably 0.1 to 100 μm.

The thickness ratio of the thermoplastic resin layer to the resin composition layer (thermoplastic resin layer/resin composition layer) is not particularly limited, but is typically greater than 1 and 30 or smaller, and preferably 2 to 30 (when a plurality of thermoplastic resin layers and a plurality of resin composition layers are present, the ratio between the thickest layers is employed). The thickness ratio of the adhesive layer to the resin composition layer (adhesive layer/resin composition layer) is typically 0.1 to 2, and preferably 0.1 to 1.

As described above, the EVOH resin composition according to an embodiment of the present disclosure is useful in producing a molded product having excellent fracture elongation properties at low temperatures, particularly a molded product having excellent hydrogen gas barrier properties and excellent fracture elongation properties at low temperatures. Furthermore, the EVOH resin composition according to an embodiment of the present disclosure is useful in producing a molded product with improved fracture elongation properties at low temperatures and excellent molding processability despite having hydrogen barrier properties. The molded product in which the EVOH resin composition of the present disclosure is used is useful in producing a fuel tank for high-pressure hydrogen gas (pressure: 1 to 100 MPa) and components of the fuel tank.

Note that "low temperatures" in "fracture elongation properties at low temperatures" typically means 0° C. or lower, and preferably about −20 to −50° C.

The molded product in which the EVOH resin composition according to an embodiment of the present disclosure is used is favorable as a packaging material, and can be processed into, for example, a tube shape, a bag shape, or the like, and used in a wide range of applications as a packaging material for various types of liquids such as foods (e.g., sweet sake, soy sauce, sauce, noodle broth, and cooking oil), beverages (e.g., wine, juice, milk, mineral water, sake, shochu (Japanese spirits), coffee, and tea), medicines, cosmetics, industrial chemicals (e.g., sodium hypochlorite, developing solutions, and battery fluids), agricultural chemicals (e.g., liquid fertilizer), and detergents.

EXAMPLES

Hereinafter, the present disclosure will be described in further detail using examples, but the present disclosure is not limited to the examples below and includes other matter that does not depart from the gist of the present disclosure. Note that "%" and "parts" in the examples mean "mass %" and "parts by mass", respectively, and "Unmodified PO" and "Acid-modified PO" in Table 1 mean "unmodified polyolefin" and "acid-modified polyolefin", respectively.

Used Materials

The following materials were used as the materials of the EVOH resin composition.

EVOH (A)

A-1: EVOH (ethylene content: 25 mol %, degree of saponification: 99.7 mol %, MFR: 4.0 g/10 minutes (at 210° C. and a load of 2160 g))

A-2: EVOH (ethylene content: 38 mol %, degree of saponification: 99.7 mol %, MFR: 50 g/10 minutes (at 210° C. and a load of 2160 g)) Unmodified Polyolefin (B)

B-1: Ethylene-butene copolymer "A4085S" manufactured by Mitsui Chemical Inc. (MFR: 3.6 g/10 minutes (at 190° C. and a load of 2160 g), density: 0.885 g/cm$^3$)

B-2: Ethylene-propylene copolymer "P0180" manufactured by Mitsui Chemical Inc. (MFR: 4.4 g/10 minutes (at 190° C. and a load of 2160 g), density: 0.869 g/cm$^3$)

Acid-Modified Polyolefin (C)

C-1: Maleic anhydride-modified ethylene-butene copolymer "MA8510" manufactured by Mitsui Chemical Inc. (MFR: 2.4 g/10 minutes (at 190° C. and a load of 2160 g), density: 0.885 g/cm$^3$), acid value: 5.5 mg KOH/g C-2: Maleic anhydride-modified ethylene-propylene copolymer "MP0610" manufactured by Mitsui Chemical Inc. (MFR: 0.4 g/10 minutes (at 190° C. and a load of 2160 g), density: 0.870 g/cm$^3$), acid value: 6.1 mg KOH/g

Example 1

Production of Pellet of EVOH Resin Composition

The components were dry-blended at a ratio shown in Table 1, and were then melt-kneaded under the conditions below using a twin-screw extruder. The obtained mixture was extruded in a strand shape and cut using a pelletizer, and thus a cylindrical pellet of the EVOH resin composition was obtained.

Melt Kneading Conditions

Diameter (D) 30 mm

L/D=56

Screw rotation rate: 400 rpm

Setting temperatures of cylinders (C): C2/C3/C4/C5/C6/C7/C8/C9/C10/C11/C12/C13/C14/C15/C16=120° C./190° C./210° C./210° C./210° C./210° C./220° C./220° C./220° C./230° C./230° C./230° C./230° C./230° C./230° C.

Setting temperature of die: 80° C.

Discharge amount: 25 kg/hr

Next, the produced pellet of the EVOH resin composition was evaluated as follows.

(1) Low-Temperature Fracture Elongation (%)

An ISO 1A dumbbell-shaped tensile test piece was produced from the obtained pellets using an injection molding machine, and a tensile test was carried out at −40° C. using a tensile testing machine. The test piece had a dumbbell shape with a width of 10 mm, a length of 110 mm, a total length of 200 mm, and a thickness of 4 mm. Note that the production and evaluation of the test piece were performed in accordance with ISO 527-2, and the measurement was performed at a tension speed of 50 mm/min. Table 1 shows the results. Note that the low-temperature fracture elongation (%) is a value obtained by calculating the elongation (%) of the test piece at the time when the test piece is fractured in the tensile test, using the equation below.

$$\text{Low-temperature fracture elongation (\%)}=[(\text{length of test piece when fractured}-\text{length of test piece before test})/\text{length of test piece before test}]\times 100 \quad \text{(Equation)}$$

(2) Melt Viscosity (mPa·s)

The obtained pellet was used as a sample to measure the melt viscosity ($\eta 1$) at a shear rate of 18 (sec$^{-1}$) and the melt viscosity ($\eta 2$) at a shear rate of 365 (sec$^{-1}$) using "Capilograph 1D" manufactured by Toyo Seiki Seisaku-sho, Ltd. under the following conditions, and then the melt viscosity ratio [($\eta 1$)/($\eta 2$)] was determined. Table 1 shows the results.

Measurement Conditions

Capillary diameter: 1 mm

Capillary length: 10 mm

Capillary temperature: 210° C.

Preheating time (time between the charge of the sample in the capillary and the start of the measurement): 5 minutes Shear rate: 18 (sec$^{-1}$) or 365 (sec$^{-1}$)

Sample amount: 15 g

Note that the melt viscosities ($\eta 1$) and ($\eta 2$) shown in Table 1 are expressed as values obtained by rounding the measurement values by the measurement performed under the measurement conditions above to unit, and the melt viscosity ratio shown in Table 1 is expressed as a value obtained by rounding the value of the melt viscosity ratio [(η1)/(η2)] calculated based on the melt viscosities (η1) and (η2) shown in Table 1 to the first decimal place.

Examples 2 to 4

Pellets of an EVOH resin composition were produced and evaluated in the same manner as in Example 1, except that the ratio of the components was changed to the ratios as listed in Table 1.

Comparative Examples 1 to 6

Pellets of an EVOH resin composition were produced and evaluated in the same manner as in Example 1, except that the ratio of the components was changed to the ratios as listed in Table 1.

TABLE 1

| | EVOH (A) | Content of EVOH (mass %) | Unmodified PO (B) | Content of unmodified PO (mass %) | Acid-modified PO (C) | Content of acid-modified PO (mass %) | (B)/(C) (mass ratio) | (A)/[(B) + (C)] (mass ratio) | Melt viscosity (η1) 18 [$sec^{-1}$] (mPa · S) | Melt viscosity (η2) 365 [$sec^{-1}$] (mPa · S) | Melt viscosity ratio (η1/η2) | −40° C. fracture elongation (%) |
|---|---|---|---|---|---|---|---|---|---|---|---|---|
| Ex. 1 | A1 | 68 | B1 | 9.6 | C1 | 22.4 | 30/70 | 68/32 | 7851 | 1310 | 6 | 18 |
| Ex. 2 | A1 | 68 | B1 | 22.4 | C1 | 9.6 | 70/30 | 68/32 | 5344 | 955 | 5.6 | 17 |
| Ex. 3 | A1 | 64 | B1 | 10.8 | C1 | 25.2 | 30/70 | 64/36 | 8855 | 1423 | 6.2 | 21 |
| Ex. 4 | A2 | 62 | B1 | 19 | C1 | 19 | 50/50 | 62/38 | 3382 | 518 | 6.5 | 30 |
| Com. Ex. 1 | A1 | 70 | B1 | 24 | C1 | 6 | 80/20 | 70/30 | 3979 | 829 | 4.8 | 11 |
| Com. Ex. 2 | A1 | 70 | — | — | C1 | 30 | 0/100 | — | 10201 | 1311 | 7.8 | 16 |
| Com. Ex. 3 | A1 | 70 | B2 | 15 | C2 | 15 | 50/50 | 70/30 | 5302 | 1112 | 4.8 | 13 |
| Com. Ex. 4 | A1 | 70 | B1 | 15 | C2 | 15 | 50/50 | 70/30 | 5327 | 1105 | 4.8 | 12 |
| Com. Ex. 5 | A1 | 68 | B1 | 25.6 | C1 | 6.4 | 80/20 | 68/32 | 3907 | 786 | 5 | 6.6 |
| Com. Ex. 6 | A1 | 64 | B1 | 28.8 | C1 | 7.2 | 80/20 | 64/36 | 4429 | 857 | 5.2 | 9.7 |

It was found from the results shown in Table 1 that Examples 1 to 4 that fulfilled the requirements prescribed in the present disclosure, namely the mass ratio [(B)/(C)] between the unmodified polyolefin (B) and the acid-modified polyolefin (C), a specific melt viscosity ratio [(η1)/(η2)], and the mass ratio [(A)/((B)+(C))] between the ethylene-vinyl alcohol copolymer (A) and the total content of the unmodified polyolefin (B) and the acid-modified polyolefin (C), had excellent fracture elongation properties at low temperatures.

On the other hand, it was found that Comparative Examples 1 to 6 that did not fulfill the requirements prescribed in the present disclosure had poor fracture elongation properties at low temperatures compared with Examples 1 to 4.

Note that a practically clear difference in the fracture elongation at −40° C. is 1%. For example, in the case where an EVOH resin composition is used for a fuel container to be mounted in an automobile, since the fuel container is large in volume (typically having a long diameter of 0.5 to 3 m and a short diameter of 0.1 to 1 m), a 1% difference in fracture elongation at low temperatures results in a significant difference in an acceptable deformation amount of a fuel container, and thus acceptable hydrogen filling pressures differ significantly. The hydrogen filling amount of a fuel tank for containing high-pressure hydrogen gas is proportional to the product of the volume of hydrogen gas capable of being contained in the fuel container and the pressure of hydrogen gas, and therefore, a difference in hydrogen filling pressure leads to a difference in the hydrogen filling amount, which leads to a difference in the cruising distance of an automobile. Accordingly, a difference in fracture elongation at low temperatures has an impact as a practically clear difference. As described above, a 1% difference in the fracture elongation at low temperatures is also a practically clear difference in cases other than the case where an EVOH resin composition is used for a fuel tank to be mounted in an automobile.

While specific modes of the present disclosure are described in the examples above, the examples above are for illustrative purposes only and should not be construed as restrictive. Various alterations that are apparent to those skilled in the art are all intended to be within the scope of the present disclosure.

INDUSTRIAL APPLICABILITY

With the EVOH resin composition of the present disclosure, it is possible to improve fracture elongation properties at low temperatures. Accordingly, a molded product containing a layer made of the EVOH resin composition is useful as a material of a fuel tank for high-pressure hydrogen gas and components of the fuel tank.

The invention claimed is:

1. An ethylene-vinyl alcohol copolymer composition comprising:

an ethylene-vinyl alcohol copolymer (A);

an unmodified polyolefin (B); and an acid-modified polyolefin (C), wherein a mass ratio [(B)/(C)] between the unmodified polyolefin (B) and the acid-modified polyolefin (C) is 75/25 to 1/99, a melt viscosity ratio [(η1)/(η2)] between a melt viscosity (η1) of the composition at 210° C. and a shear rate of 18 ($sec^{-1}$) and a melt viscosity (η2) of the composition at 210° C. and a shear rate of 365 ($sec^{-1}$) is 5.6 or greater, and a mass ratio [(A)/((B)+(C))] between the ethylene-vinyl alcohol copolymer (A) and a total content of the unmodified polyolefin (B) and the acid-modified polyolefin (C) is 60/40 or more and less than 75/25.

2. The ethylene-vinyl alcohol copolymer composition according to claim 1, wherein the unmodified polyolefin (B) is an unmodified ethylene-α-olefin copolymer.

3. The ethylene-vinyl alcohol copolymer composition according to claim 1, wherein the unmodified polyolefin (B) is an unmodified ethylene-butene copolymer.

4. The ethylene-vinyl alcohol copolymer composition according to claim 1, wherein the acid-modified polyolefin (C) is an acid-modified ethylene-α-olefin copolymer.

5. The ethylene-vinyl alcohol copolymer composition according to claim 1, wherein the acid-modified polyolefin (C) is an acid-modified ethylene-butene copolymer.

6. The ethylene-vinyl alcohol copolymer composition according to claim 1, wherein the unmodified polyolefin (B) is an unmodified ethylene-butene copolymer, and the acid-modified polyolefin (C) is an acid-modified ethylene-butene copolymer.

7. The ethylene-vinyl alcohol copolymer composition according to claim 1, wherein the acid-modified polyolefin (C) has a melt flow rate of 1.0 g or more/10 minutes under conditions of a temperature of 190° C. and a load of 2160 g.

8. The ethylene-vinyl alcohol copolymer composition according to claim 1, wherein the melt viscosity (η1) is 10000 (mPa·s) or less.

9. The ethylene-vinyl alcohol copolymer composition according to claim 1, wherein the mass ratio [(A)/((B)+(C))] between a content of the ethylene-vinyl alcohol copolymer (A) and a total content of the unmodified polyolefin (B) and the acid-modified polyolefin (C) is 60/40 or more and 68/32 or less.

10. A molded product comprising at least one layer made of the ethylene-vinyl alcohol copolymer composition according to claim 1.

* * * * *